UNITED STATES PATENT OFFICE.

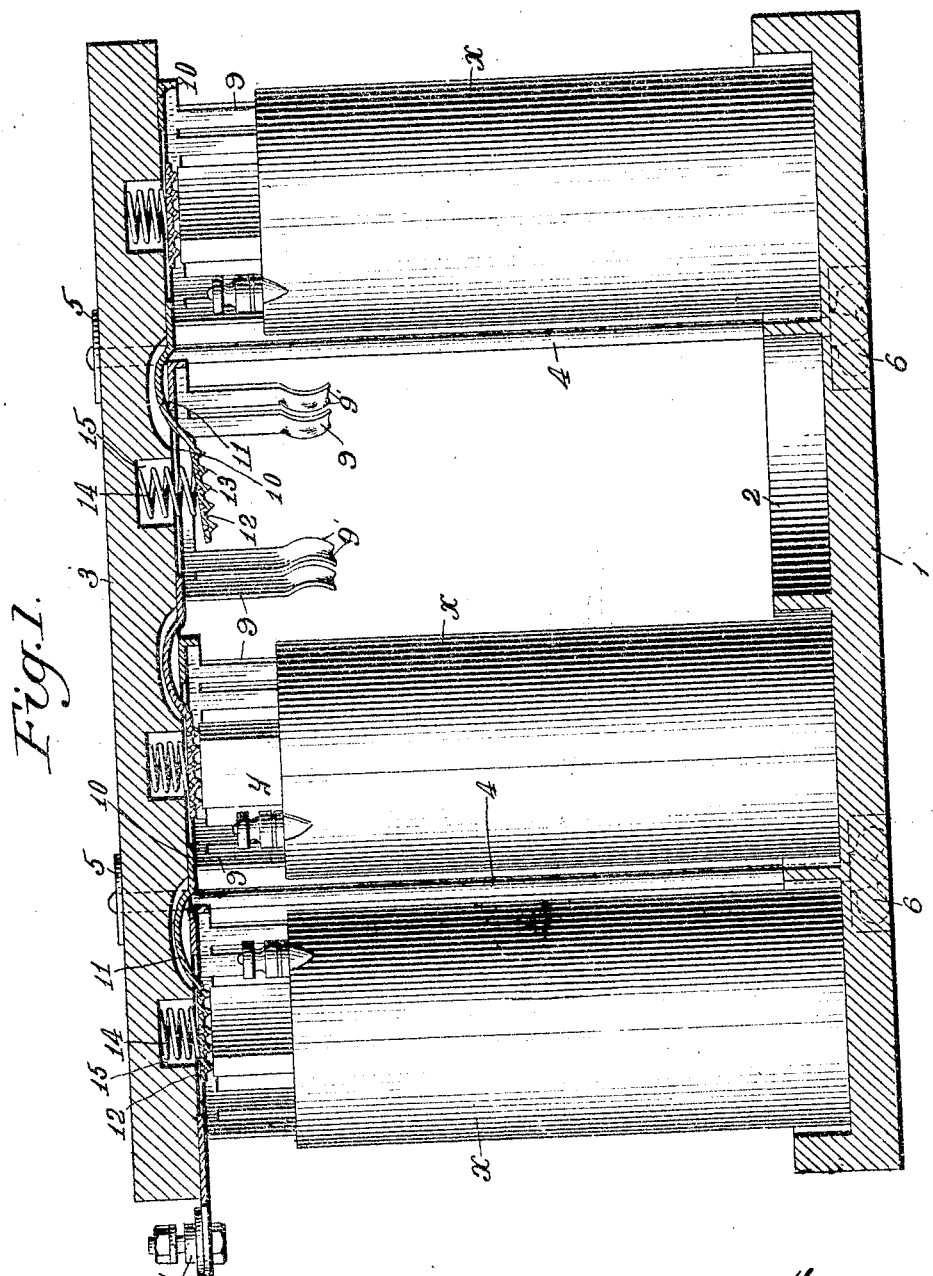

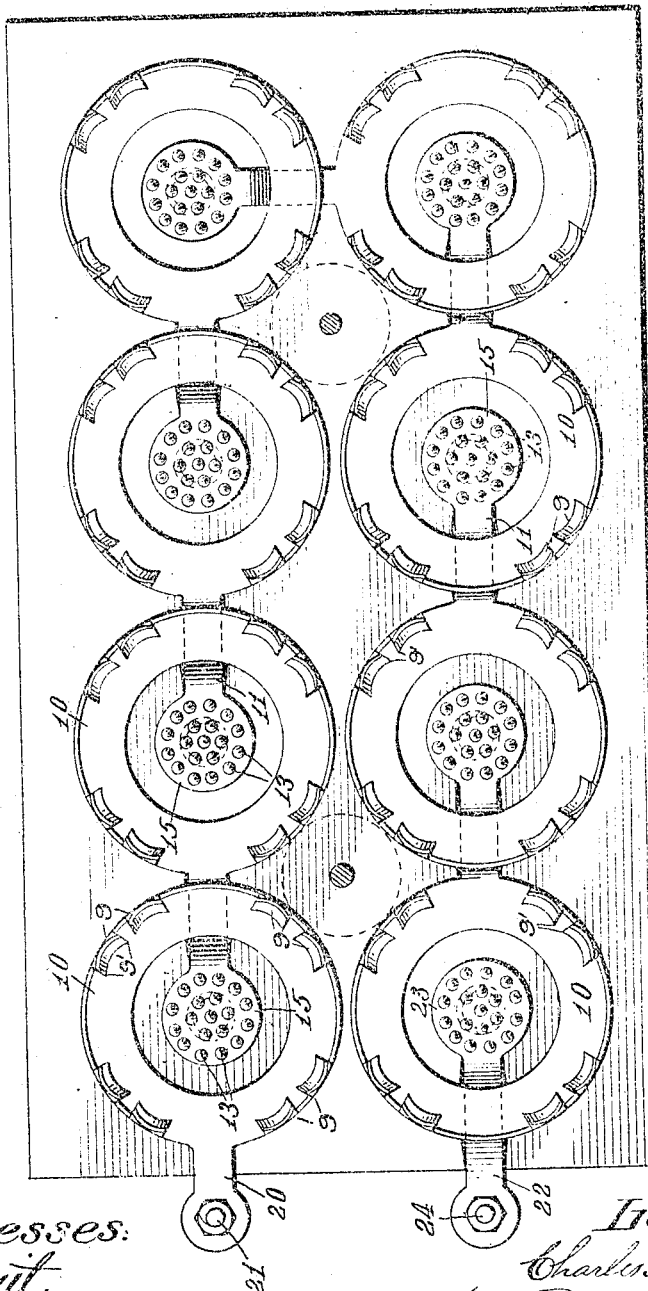

CHARLES T. MASON, OF SUMTER, SOUTH CAROLINA.

BATTERY-HOLDER.

No. 912,705.

Specification of Letters Patent.

Patented Feb. 16, 1909.

Application filed December 19, 1908. Serial No. 468,325.

*To all whom it may concern:*

Be it known that I, CHARLES T. MASON, a citizen of the United States, residing at Sumter, county of Sumter, and State of South Carolina, have invented certain new and useful Improvements in Battery-Holders; and I do hereby declare the following to be a full, clear, and exact description of the invention, such as will enable others skilled in the art to which it appertains to make and use the same.

The invention relates to battery holders for electric cells and has for its object to provide a simple, cheap and efficient form of apparatus by means of which a series of dry cells or similar electric generators may be properly connected together and held in such connected relation without the necessity of electrically connecting the cells one with another by means of the usual conducting wires; a positive and efficient electrical connection being established between the several dry cells by the simple act of assembling the cells in the holder.

To this end the invention comprises a frame or support overlying the series of dry cells having attached to its under surface a series of cell connectors, each of said connectors including an annular conducting plate having multiple spring fingers projecting therefrom to engage the metallic outer casing of the dry cell, and a resilient tongue extending from said conductor plate and having its outer end extending into and lying within the open center of the next successive conductor plate, so that, when the dry cells are inserted in the spring clips of the conductor plates, the outer metallic shell or casing of each cell forms a good electrical contact with the spring fingers of its engaging clip and the upper end of the carbon element of the cell is brought into electrical contact with the end of the tongue of the next preceding conductor plate.

For the purpose of conveniently holding and locking the cells in position, there is preferably provided a lower frame or support which is adjustably connected with the upper frame or support by means of tie rods or equivalent devices connecting the respective supports; and in order to provide terminal connections, the tongue member of the final conductor plate is provided with a binding post to receive a connecting wire or lead and the first conductor plate of the series is associated with a separate tongue member which is provided with a binding post to receive a conducting lead or wire, and the several tongues of the conductor plates are so constructed that they tend normally to engage the next succeeding plate in the series to establish electrical contact therewith when no cell is applied to the latter clip, so that electrical continuity through the series of connecting plates or clips is maintained irrespective of the number of cells in the holder.

In the accompanying drawings:—Figure 1 is a longitudinal sectional elevation of the improved holder showing cells in three of the clips and with no cell in one of the intermediate clips. Fig. 2 is a plan view of the under side of the upper frame or support.

Referring to the drawings, 1 indicates a lower frame or support made of wood or any other suitable insulating material, preferably provided with a series of circular recesses 2 adapted to receive the bottoms of the dry cells 4 of the usual and ordinary form. Associated with bottom support 2 is an upper frame or support 3 and connecting the supports 2 and 3 are tie rods 4, provided with washers on their upper ends and wing nuts 6 on their lower ends, so that when a series of dry cells are placed between the upper and lower frames, the latter are drawn together by means of the tie rods 4 to clamp the cells in position.

On the under face of the upper frame 3 is secured a series of metallic connectors, by means of which the several cells are electrically connected. Each of said connectors comprises an annular conducting plate 10 provided about its peripheral edge with a series of downwardly projecting spring fingers 9 which are curved inwardly and then outwardly near their lower ends to firmly engage the outer surface of the metallic shell of the dry cell and establish a good electrical connection with said shell. The lower portions of the spring fingers 9 are also preferably curved laterally upon a shorter radius than that of the shell, thereby providing edges 9' which cut or scrape the surface of the metal casing of the cell to form a clean, bright electric contact, which is renewed every time the shell is shifted or adjusted. Each of said conductor plates is provided with a radially extending tongue 11 which is given an upward bend intermediate its length and is provided on its outer end with a disk-like contact which is roughened on its lower surface, as by means of a series of points or nodules stamped in the surface of the metal. The tongue 11 when made of brass or other metal capable of being tempered sufficiently to render the same resilient, is given a normal set which tends to force the tongue downward into contact with the upper surface of the next succeeding conductor plate in the series and this downward set of the spring tongue is accentuated by the upward bend therein, to accommodate which the upper frame 3 is notched out at appropriate points, as indicated in Fig. 1. In order to render the downward set of the spring tongue 11 positive, and to insure a firm contact between said tongue and the next succeeding plate, or between the end of the tongue and the carbon of the cell located in the next succeeding plate, a helical spring 14 is provided for each tongue, said spring being located in a recess 15 in the under face of the upper frame 3 and engaging the upper face of the end of tongue 11. The final conductor plate or clip has its tongue member perforated to receive a binding post 21 to which one of the circuit wires may be connected. The tongue 20 on the final plate, indicated in the drawings, is shown as somewhat smaller than the tongues on the other plates, but it will be obvious, of course, that this tongue may be of the same size and shape as the corresponding tongues on the other plates or clips. In order to afford an efficient connection for the leading-in circuit wire, there is secured to the under side of frame 3, adjacent the initial clip, a separate tongue piece 22 the inner end of which lies centrally within the annular opening in the conductor plate 10, and is provided with a roughened under surface similar to that on the tongues 15 and is likewise provided with the same type of helical spring 14 to force the tongue into engagement with the conductor plate 10, or with the upper end of the carbon element of the first cell, in the alternative. The outer end of said tongue 22 is provided with a binding post or other equivalent connector 24, by means of which the leading-in wire of the circuit is connected with the device.

From the foregoing, it will be seen that when a dry cell is inserted in each of the conductor clips and the upper frame 3 is forced downward toward the cells, the several spring tongues 11 will engage the carbon element of the cells with a firm electrical contact, the roughened or pointed surface of the tongue face biting into the upper end of each of the carbon elements of the cells, as indicated in Fig. 1. Similarly the spring fingers 9 of the conductor clips will forcibly engage and embrace the outer surface of the metallic shell of the dry cell, thereby establishing electrical contact with the other member of the electrical couple of said cell, and the several cells will be connected in series and the current from the several cells may be utilized for any desired purpose by connecting the external circuit leads to binding posts 21 and 24. When it is desired to renew any or all of the cells, it is necessary only to loosen the thumb nuts 6 and lift the upper frame sufficiently to free the cells in the holder and then replace any or all of the cells with fresh cells, subsequent to which the upper frame is set down on the cells and the tie rods tightened up by means of the thumb nuts 6, which has the effect of forcing each of the cells $x$ into the corresponding spring clips 9 until the carbon element of the cell engages and lifts the tongue 11 of the next preceding clip or connector member against tension of spring 14, sufficiently to break the contact between said tongue and the conductor plate which is engaged by the cell and establish the circuit through the cell. It will be apparent that, if one or more of the cells be omitted, the circuit through the remaining cells will still be maintained, inasmuch as the spring tongue of the clip or connector next preceding the connector in which there is no cell, will establish electrical contact with the latter connector as indicated in Fig. 1.

The invention is particularly well adapted for all purposes requiring a series of dry cells and is especially well fitted for use in connection with explosive engines, such as are used on automobiles, motor boats and for general power purposes. It will also be noted that an important feature of the invention is the arrangement of the upper and lower frame adjustably connected by means of the tie-rods or similar means, whereby the cell connectors, carried by the upper frame are firmly engaged with the elements of the cells and the electrical connections thereby established are efficiently and reliably maintained irrespective of the shocks and jars to which the battery holder may be subjected, incident to use in automobile works or the like. Furthermore, although the description has been particularly directed to the use of dry cells of the ordinary type it will be understood that the invention is not limited in any sense to dry cells but is adapted for use with other forms of cellular generators or batteries, especially accumulators or secondary batteries with sealed tops and semi dry batteries, which are well known.

What I claim is:—

1. An electrical connector for electric cells comprising a circular spring clip adapted to engage the casing of the cell, and a resilient conductor tongue integral with and extending from said clip.

2. An electrical connector for electric cells comprising a metal plate having a series of spring fingers substantially normal thereto to clamp the upper portion of a dry cell, and a conducting tongue integral with and extending from said plate.

3. An electrical connector for electric cells comprising a circular base having spring cell engaging fingers projecting therefrom, and a resilient conducting tongue formed on and extending from said plate, the outer end of said tongue being depressed below the plane of said base.

4. A battery holder for electric cells, comprising a frame or support, and a series of cell connectors carried thereby, each of said connectors including an annular conductor plate having a series of cell engaging spring fingers projecting therefrom, and a resilient integrally formed tongue the outer end of which extends into and lies within the open center of the next successive conductor plate.

5. A battery holder for electric cells, comprising a frame or support, and a series of cell connectors carried thereby, each of said connectors including an annular conductor plate having a series of cell engaging spring fingers projecting therefrom, a resilient tongue the outer end of which extends into and lies within the open center of the next successive conductor plate, and springs interposed between the tongue ends and the frame normally tending to force said tongues into engagement with the subjacent conductor plates.

6. A battery holder for electric cells, comprising a lower frame and an upper frame, means for adjustably connecting said frames, and a series of cell connectors carried by the upper frame, each of said connectors including an annular conductor plate having a series of cell engaging spring fingers projecting therefrom, and a conducting tongue the outer end of which extends into and lies within the open center of the next successive conductor plate, and springs carried by said upper frame and engaging the tongues aforesaid to force the same downward.

7. A battery holder for electric cells, comprising a lower frame and an upper frame, means for adjustably connecting said frames, and a series of cell connectors carried by the upper frame, each of said connectors including an annular conductor plate having a series of cell engaging spring fingers projecting therefrom, and a conducting tongue the outer end of which extends into and lies within the open center of the next successive conductor plate, springs carried by said upper frame and engaging the tongues aforesaid to force the same downward, and wire attaching tongues for the end cell connectors.

8. A battery holder for electric cells, comprising a lower frame, an upper frame, a series of cell connectors carried by the upper frame, and means adjustably connecting said frames; whereby the latter may be caused to clamp the cells between them and hold said cells in contact with the connectors.

In testimony whereof I affix my signature, in presence of two witnesses.

CHARLES T. MASON.

Witnesses:
A. L. SHAW,
E. M. HALL.